United States Patent [19]
Borowski

[11] Patent Number: 6,148,845
[45] Date of Patent: Nov. 21, 2000

[54] VALVE HOUSING WITH A CONNECTING PART AND A CAP

[75] Inventor: Ralf Borowski, Bremen, Germany

[73] Assignee: Gestra GmbH, Bremen, Germany

[21] Appl. No.: 09/274,784

[22] Filed: Mar. 23, 1999

[30] Foreign Application Priority Data

Apr. 6, 1998 [DE] Germany .............................. 198 15 340

[51] Int. Cl.[7] .................................................. F16T 1/00
[52] U.S. Cl. ................................ 137/183; 236/56; 236/58
[58] Field of Search .............................. 137/183; 236/56, 236/57, 58, 59

[56] References Cited

U.S. PATENT DOCUMENTS

| 3,169,704 | 2/1965 | Domm et al. . | |
|---|---|---|---|
| 3,433,412 | 3/1969 | Breton ............................... | 137/183 X |

FOREIGN PATENT DOCUMENTS

| 1115065 | 10/1961 | Germany . | |
|---|---|---|---|
| 1948583 | 10/1966 | Germany . | |
| 1238487 | 4/1967 | Germany . | |
| 2059798 | 6/1972 | Germany . | |
| 2733610 | 4/1979 | Germany . | |
| 432385 | 7/1935 | United Kingdom ................... | 137/183 |
| 575490 | 2/1946 | United Kingdom ................... | 137/183 |

*Primary Examiner*—Gerald A. Michalsky
*Attorney, Agent, or Firm*—Collard & Roe, P.C.

[57] ABSTRACT

The valve housing can be used for valves and steam traps with a compact automatic control unit. It has a connecting part with two flow ducts and a base on which the open end of a cap rests tightly. Two post-like projections with fastening orifices are provided on the longitudinal axis of the flow ducts on the connecting part next to the base and the cap. The cap has two laterally projecting screw bearings. They are arranged at a distance from the open end of the cap in front of the ends of the projections on the longitudinal axis of the flow ducts and are provided with screw holes. The cap is connected to the connecting part by two fastening screws which penetrate through the screw holes and are screwed into the fastening orifices of the projections.

20 Claims, 5 Drawing Sheets

VALVE HOUSING WITH A CONNECTING PART AND A CAP

BACKGROUND OF THE INVENTION

1. Field of the Invention

The present invention relates to a valve housing which comprises a connecting part and a cap.

2. The Prior Art

Valve housings of this type are used, in particular, for valves and steam traps comprising an automatic compact control unit.

Known valve housings for valves and steam traps of this type comprise caps with a square flange as screw bearing. The caps are connected to the connecting part by four fastening screws (DE GM 1,948,583; U.S. Pat. No. 3,169,704; DE OS 2,059,798). This connection has been successfully used in practice. The fastening screws can be released without great expenditure of force for inspection or repair. No deforming stresses act on the pipe in which the valve housing is installed.

For connection to the pipe, the valve housings are equipped with different connecting ends, as required, for example welding sleeves (DE GM 1,948,583), screw-threaded sleeves (U.S. Pat. No. 3,169,704) or connecting flanges (DE OS 2,059,798). Known valve housings have a relatively small distance between the square flange for the cap and the connecting flanges. This applies, in particular, if the valve housings are constructed in the conventional standard lengths. The small distance between the connecting flange and the square flange is adequate to accommodate the screw nuts. However, the flange screws cannot be inserted into the screw holes in the connecting flanges from the valve housing side. Because of the respective local conditions, however, the flange screws cannot be inserted into the screw holes from the pipe side in each case.

As an alternative to the connection of the connecting part and the cap by means of fastening screws, a direct screw connection between the connecting part and the cap has been proposed for valve housings of automatic valves and steam traps (DE AS 1,115,065; DE PS 2,733,610). The square flange which obstructs insertion of the flange screws is unnecessary here. However, the threaded cap has only been used successfully in thermodynamic steam traps (DE PS 1,238,487). These steam traps have a very small diameter disc as the control element. The cap is also correspondingly small in size. On the other hand, temperature-sensitive control units are greater, despite having a compact construction. This also applies to the caps. A correspondingly great torque is required to tighten or release the thread of such a cap. This is associated with the risk of distortion of the attached pipe. Therefore, the threaded cap has not been successfully used on valve housings for valves and steam traps having control units of this type.

SUMMARY OF THE INVENTION

It is an object of the present invention to provide a valve housing which permits simple fastening and release of the cap without damaging the pipe. If the valve housing is constructed with connecting flanges, it is possible to insert the flange screws from the side of the valve housing into the screw holes.

This object is achieved according to the present invention by providing a valve housing comprising a connecting part having two connecting ends and two mutually aligned flow ducts which each extend into one of the two connecting ends into the valve housing along a longitudinal axis, one of said ends inputs a supply of fluid medium and the other of said ends discharges said fluid medium, respectively; said connecting part having a base arranged to a side of the flow ducts; a cap having an open end resting on the base of the connecting part and said cap together with the base forming a housing interior which communicates with the flow ducts and accommodates a control unit for controlling the flow of fluid medium through the valve housing; the connecting part has on either side next to the base on the longitudinal axis of the flow ducts screw fastening means; the cap has two diametrically opposed laterally projecting screw bearings which are arranged on the longitudinal axis of the flow ducts; and the cap is connected to the connecting part by two fastening screws, which connect said screw bearings to said screw fastening means.

The connecting part and the cap are connected by two fastening screws. Assembly costs are accordingly reduced in comparison with the known design with four fastening screws. Harmful stresses which lead to distortion of the pipe do not occur. As the two screw bearings provided on the cap are located on the longitudinal axis of the flow ducts, they are located between the screw holes of the connecting flanges if the valve housing is provided with flanges. The flange screws can, therefore, be inserted into the screw holes of the connecting flanges from the side of the valve housing.

Although the connecting part has means for accommodating the fastening screws in the region of the flow ducts, the base and, therefore, the control unit can be provided in the immediate vicinity of the flow ducts. The overall height of the valve housing can, therefore, be kept to a minimum. The distance between the screw bearings and the open end of the cap also results in a particularly dimensionally stable portion of the cap which is not subjected to deformation by the effect of the fastening screws on the screw bearings.

In another embodiment of the invention, there are projections which they are constructed as fastening posts. The projections are restricted to the immediate region of the fastening screws of the cap. The volume of material required is, therefore, minimum and the base of the connecting part is particularly easily accessible. If the height of the projections corresponds to the screw-in length of the fastening screws, the wall of the flow ducts can be kept to a minimum. This also contributes advantageously to a small quantity of material and, therefore, a minimum weight.

In a further embodiment of the invention, the screw bearings are located radially outside the region of the screw holes of the connecting flanges. This is advantageous for insertion of the flange screws and also for the accessibility of the screwing tools for tightening or releasing the flange screws.

In another embodiment of the invention, the base of the connecting part, the cap, and the screw bearings provide for high dimensional stability. When connecting flanges are provided, there is a particularly large amount of space available for insertion of the flange screws.

In a further embodiment of the invention, particularly small external dimensions of the cap are provided with respect to its internal dimensions. The size of the cap is particularly small in the longitudinal direction of the flow ducts and this is advantageous for the overall length of the valve housing. At the same time, however, there is also a generous amount of space available for the screwing tools for tightening and releasing the fastening screws connecting the cap to the connecting part. The cap, therefore, has high dimensional stability when stressed by medium pressure and also under the influence of screwing forces.

In known valve housings, the control unit of the valve or steam trap is arranged centrally in the surrounding cap. In contrast to this, the present invention provides an eccentric arrangement. The internal dimension of the cap required both for the disposition of the control unit and for the opening of the connecting ducts into the interior of the valve housing can, therefore, be minimized.

In another embodiment, the invention provides a particularly desirable axial offset between cap and control unit. As previously mentioned, small internal dimensions and correspondingly small external dimensions contribute to a minimum overall length of the valve housing and also facilitate insertion of the flange screws.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawings are designed for the purpose of illustration only and not as a definition of the limits of the invention.

In the drawing, wherein similar reference characters denote similar elements throughout the several views.

DETAILED DESCRIPTION OF PREFERRED EMBODIMENTS

Figure 1:
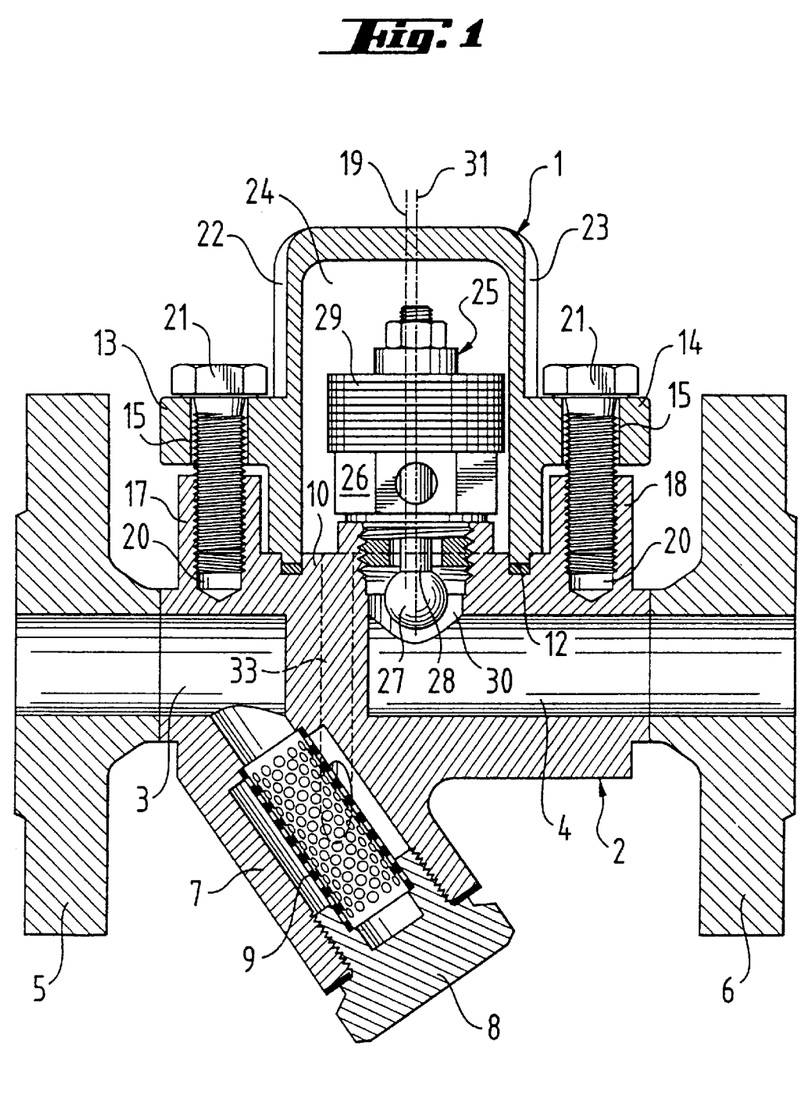
FIG. 1 is a longitudinal section through a steam trap with connecting flanges.

Turning now in detail to the drawings, FIG. 1 shows a valve housing of the steam trap which comprises a cap 1 and a connecting part 2. The connecting part 2 is provided with flow ducts 3,4 and, at its two connecting ends, with connecting flanges 5,6 which are all mutually aligned. The flow duct 3 extends from the connecting flange 5 into the connecting part 2. The connecting part 2 comprises a nozzle 7 which is arranged obliquely to the flow ducts 3,4 and of which the free end is closed by a stopper 8. Within the nozzle 7 is a tubular strainer 9 of which the interior communicates with the flow duct 3. The flow duct 4 extends from the connecting flange 6 into the connecting part 2.

Figure 2:
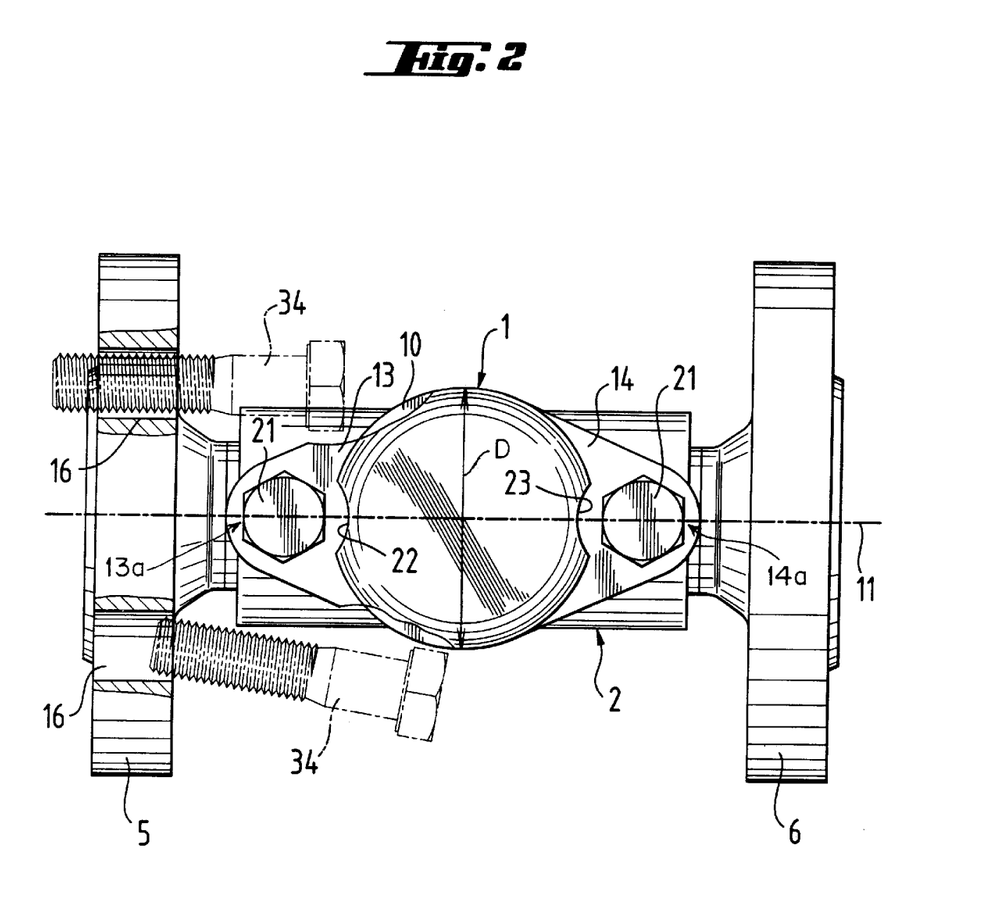
FIG. 2 is a top view of the steam trap of FIG. 1 with details in section.
Figure 3:
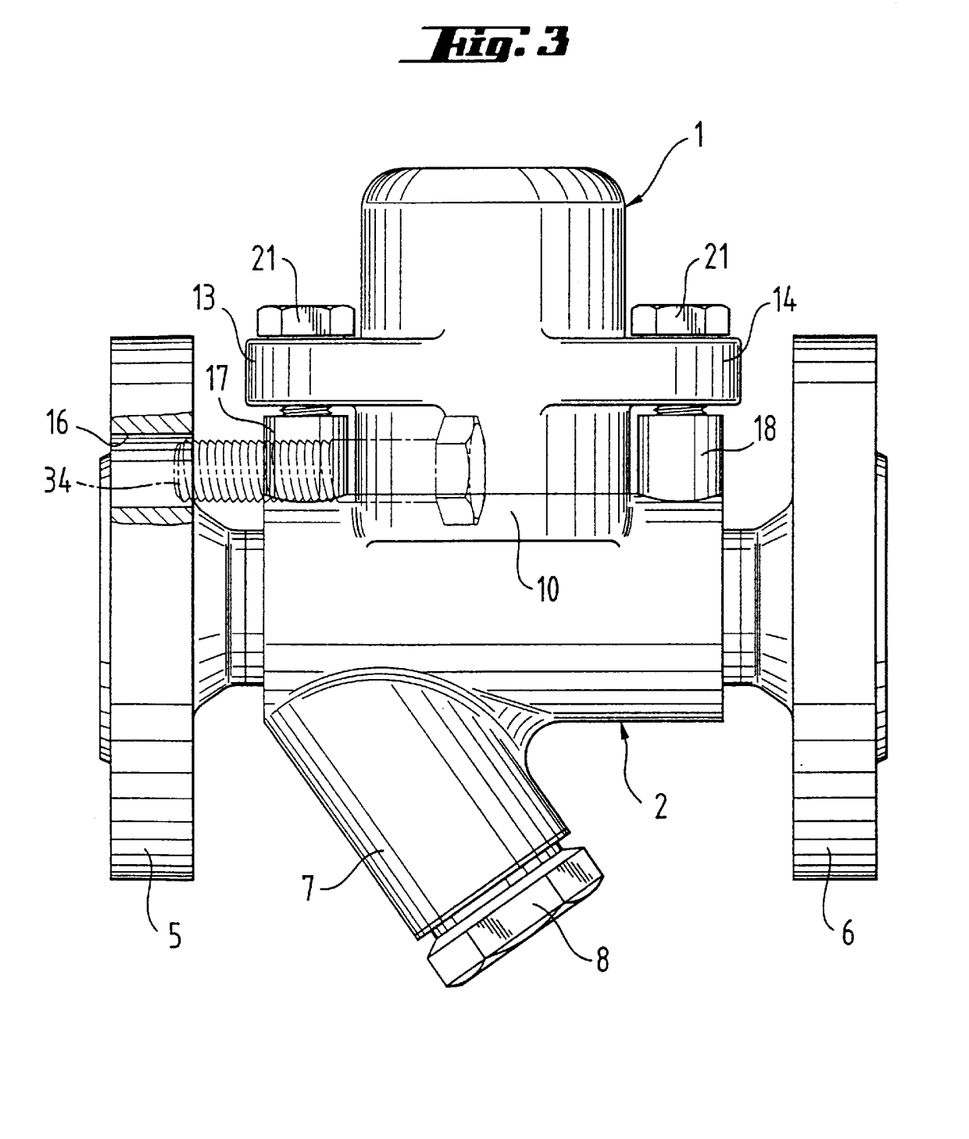
FIG. 3 is a front view of the steam trap of FIG. 1 with details in section.

The connecting part 2 comprises a base 10 at the side, parallel to the flow ducts 3,4. The base 10 is located on the side of the connecting part 2 remote from the nozzle 7 and is designed as a circular face which projects transversely to the longitudinal axis 11 of the flow ducts 3,4 beyond the remainder of the connecting part 2 (FIG. 2). The cap 1 has a substantially circular cross-sectional shape and has an external diameter D. It rests tightly on the base 10 with its open end 12 and is provided with two laterally projecting screw bearings 13, 14. These are arranged in a diametrically opposed manner on the flow duct longitudinal axis 11 (FIG. 2) and have screw holes 15 therein. Furthermore, the screw bearings 13, 14 are arranged at such a distance from the connecting part 2 and from the open end 12 of the cap 1 that they are located radially outside the screw holes 16 of the connecting flanges 5,6 in the longitudinal direction of the cap 1 (FIG. 3). The shape of the screw bearings 13, 14 is substantially triangular. It passes tangentially into the external diameter D of the cap 1 whereas it is rounded at its other end 13a, 14a (FIG. 2).

Figure 4:
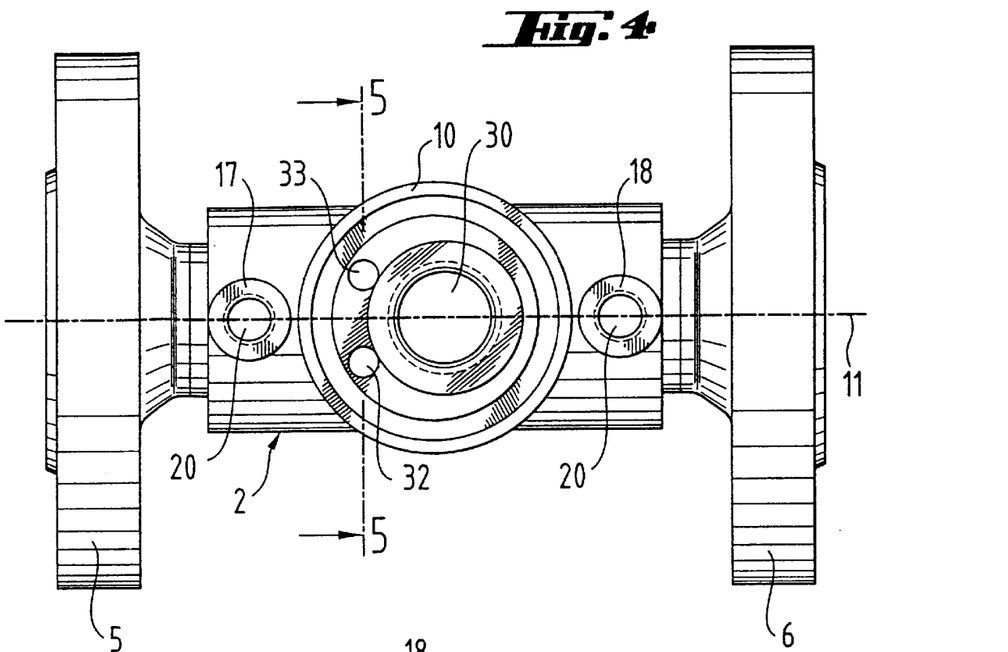
FIG. 4 is a plan view of the connecting part of the steam trap of FIG. 1.

Next to the base 10 on either side, the connecting part 2 has two projections 17,18 designed in the manner of posts on the flow duct longitudinal axis 11 in the immediate vicinity of the cap 1 (FIG. 4). They extend transversely to the flow ducts 3,4 and at the same time parallel to the longitudinal axis 19 of the cap 1 (FIG. 1). The screw bearings 13,14 of the cap 1 are located at a distance in front of the ends of the projections 17,18. The projections 17,18 have screw-threaded fastening orifices 20 with the same axis as the screw holes 15 of the screw bearings 13,14. Two fastening screws 21 project through the screw holes 15 of the screw bearings 13,14 and are screwed into the fastening orifices 20. The length of the projections 17,18 essentially corresponds to the screw-in length of the fastening screws 21 which connect the cap 1 rigidly to the connecting part 2.

On the side remote from the connecting part 2 on the far side of the screw bearings 13,14, the cap 1 is provided with radial indentations 22,23 in the region of the fastening screws 21. They extend from the screw bearings 13,14 to the closed free end of the cap 1 and, therefore, allow sufficient free space for screwing tools, for example box spanners, for tightening/releasing the fastening screws 21. As only two fastening screws 21 are provided, the application or removal of the cap 1 requires only a minimum of effort. Owing to the indentations 22,23, moreover, the overall size of the cap 1 can be kept small in the direction of the flow duct longitudinal axis 11 and this is beneficial for the overall length of the connecting part 2 and, therefore, the valve housing. From its open end 12 to the screw bearings 13,14, the cap 1 has a constantly annular cross section and, therefore, high dimensional stability. The holding forces exerted on the cap 1 by the two fastening screws 21 via the screw bearings 13,14, therefore, produce a reliable seal between cap 1 and base 10.

The cap 1 and the base 10 of the connecting part 2 form the housing interior 24 of the valve housing in which is located an automatic control unit 25 for controlling the flow of medium. As the base 10, in contrast to the screw bearings 13,14, is located in the immediate vicinity of the flow ducts 3,4, the control unit 25 can also be arranged close to it. The total height of the cap 1 and connecting part 2 is, therefore, minimized.

Figure 5:
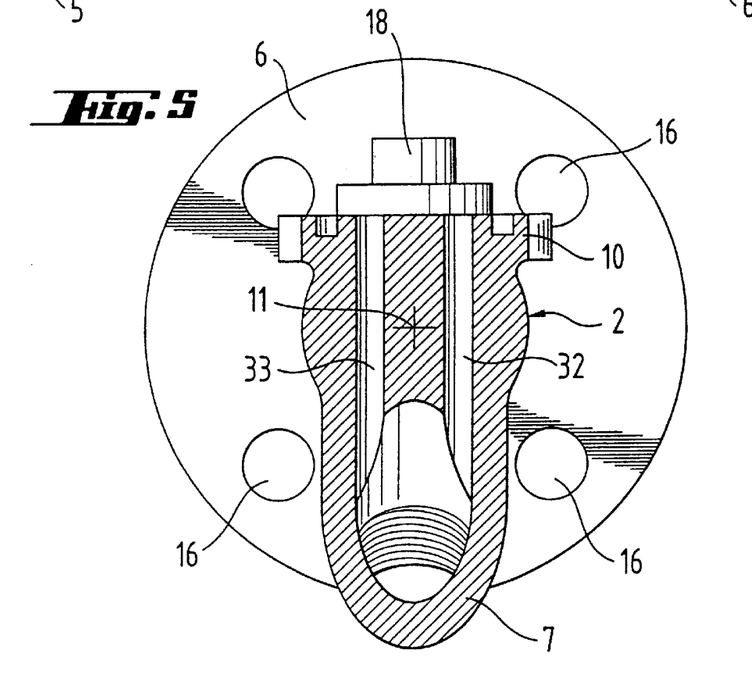
FIG. 5 is a section view along line 5—5 of the connecting part of the steam trap shown in FIG. 4.

The control unit 25 has a valve seat bush 26, a closure member 27, cooperating therewith, with a closure member shank 28 and a bimetallic control element 29. The bimetallic control element 29 consists of laminated bimetallic discs which bend when heated. It rests with one end on the valve seat bush 26 while its other end acts in the lifting direction on the closure member shank 28. The valve seat bush 26 is screwed into a connecting duct 30 extending between the housing interior 24 and the flow duct 4 provided for the discharge of medium. The common longitudinal axis 31 of connecting duct 30 and control unit 25 is offset from the cap longitudinal axis 19 in the direction of the connecting flange 6. In other words, the control unit longitudinal axis 31 is offset in the direction of the connecting end of the flow duct 4 connected to the connecting duct 30. The axial offset is so great that the control unit 25 is located, with its part which is most salient in the direction of the flow duct longitudinal axis 11—the bimetallic control element 29—in the immediate vicinity of the cap 1. There is only a minimal lateral free space between cap 1 and control unit 25 adjacent to indentation 23. The lateral free space is much greater on the diametrically opposed side adjacent to indentation 22. Medium entering the housing interior 24 can, therefore, flow around and contact the bimetallic control element 29 in an intensive manner. Owing to the axial offset, the base 10 has its greatest radial width between the connecting duct 30 and the cap 1 on this side. A respective connecting duct 32,33 is provided on either side of the flow duct longitudinal axis 11 in the connecting part 2 in this region (FIGS. 4,5). Both connecting ducts 32,33 lead into the nozzle 7. The flow duct 3 consequently communicates via nozzle 7 and connecting ducts 32,33 with the housing interior 24. The axial offset and the two connecting ducts 32,33 connected in parallel provide a small diameter cap 1 with a good supply of medium.

When the steam trap is installed in a pipe from which condensate is to be drained (not shown), the connecting flanges 5,6 of the connecting part 2 are connected to connecting flanges of the condensate pipe (not shown) by means of flange screws 34. As shown in FIG. 2 and FIG. 3 by the example of some flange screws 34 (shown in dot-dash lines), the flange screws 34 can be inserted without difficulty into the screw holes 16 of the connecting flange 5 from the side facing the connecting part 2. Neither the cap 1 nor its screw bearings 13,14 nor the projections 17,18 of the connecting part 2 obstruct insertion of the flange screws 34. A small diameter for the cap 1 has proven advantageous here. Adequate space is also available for screwing tools for tightening and releasing the flange screws 34. This applies to both connecting flanges 5,6.

Fluid medium flows through the flange 5 into the flow duct 3 of the steam trap and from there into the strainer 9 (FIG. 1). From here it passes radially outwards into the surrounding nozzle 7, any particles of dirt contained in the condensate being retained by the strainer 9. The stopper 8 allows cleaning of the strainer 9, as necessary. From the nozzle 7, the medium flows in parallel through the two connecting ducts 32,33 (FIG. 5) into the housing interior 24 and contacts the bimetallic control element 29 there. In the case of liquid condensate which is to be drained, the temperature is lower than a predetermined closure temperature and the closure member 27 is located in the open position (FIG. 1). The condensate can flow from the housing interior 24 through the valve seat bush 26 into the connecting duct 30 and from there into the flow duct 4 and can issue from the steam trap through the connecting flange 6. If vapor flows into the housing interior 24 after drainage of the condensate, the temperature exceeds the closing temperature of the control unit there. The bimetallic discs of the bimetallic control element 29 bend accordingly and move the closure member 27 in the closing direction until it comes to rest tightly on the valve seat bush 26. Steam is prevented from. flowing out of the housing interior 24.

Figure 6:
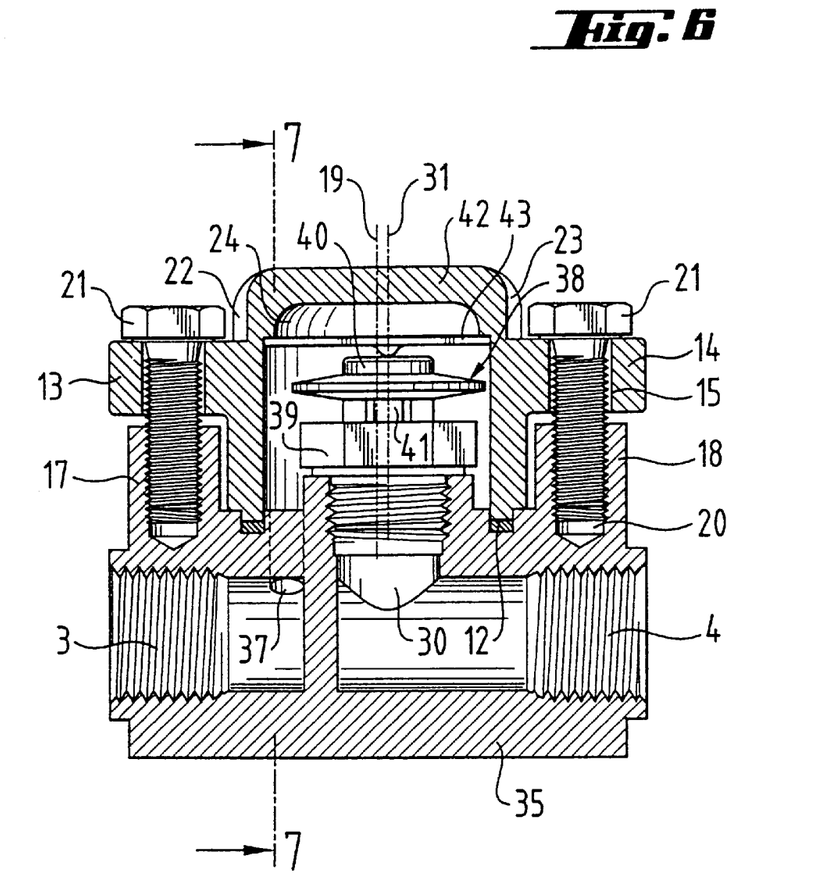
FIG. 6 is a longitudinal sectional view of a second embodiment through a steam trap with screw-threaded sleeves.
Figure 7:
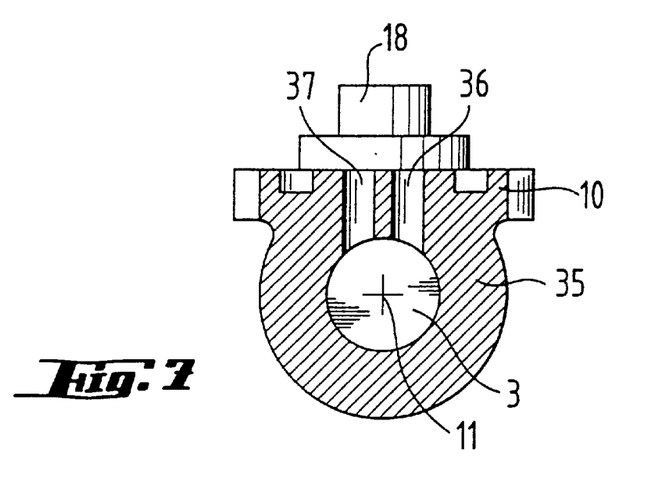
FIG. 7 is section view along line 7—7 of the connecting part of the steam trap shown in FIG. 6.

In a second embodiment, the connecting part 35 of the steam trap according to FIG. 6 has screw-threaded sleeves for connection to a pipe at the connecting ends of its flow ducts 3,4. A respective connecting duct 36,37 is provided on either side of the flow duct longitudinal axis 11 in the connecting part 35 (FIG. 7). The two connecting ducts 36,37 produce a direct connection between the flow duct 3 and the housing interior 24. The control unit 38 provided in the housing interior 24 comprises a valve seat bush 39 on which is arranged a diaphragm capsule 40 with a closure member 41. The overall height of the diaphragm capsule 40 is small and the cap 42 correspondingly low. A holding spring 43 resting on the cap 42 fixes the diaphragm capsule 40 in its installation position.

Diaphragm capsules 40 of this type are well known. They have a chamber filled with an expansion medium or an evaporation medium and a diaphragm acting on the closure member 41 in a reciprocating manner (not shown). Once the proposed closure temperature is reached, the diaphragm is bent by the excess pressure of the expansion/evaporation medium prevailing in the chamber and the closure member 41 is brought to rest tightly on the valve seat bush 39. If the temperature in the chamber falls below the closure temperature, the pressure surrounding the diaphragm capsule 40 prevails and the closure member 41 moves to its open position.

The steam trap according to FIG. 6 and FIG. 7 is otherwise identical in configuration and operation to that shown in FIGS. 1 to 5.

In FIG. 1, the connecting flanges 5,6 are shown as parts which are connected to the connecting part 2 by welding. This three-part design affords the advantage that the same unmachined connecting part can be used for valve housings with flange connection and those with sleeve connection (screw-threaded sleeves, welding sleeves). In another embodiment, it is possible to provide a single-part connecting part with integrated connecting flanges. A further embodiment with a strainer as well as an embodiment without a strainer can similarly be provided for all types of connection (connecting flanges, sleeves). Although steam traps with a temperature-sensitive control unit are shown in the drawings, the valve housing can similarly be used for steam traps with a different control unit of compact design, for example those with a thermodynamic control unit. The valve housing is also suitable for valves with an automatic control unit of compact design, for example for thermally controlled or pressure-controlled valves. The flow through the valve housing can be selected, if necessary, such that the control unit is located downstream of the shut-off position formed by valve seat bush and closure member. The fastening screws for the cap can be designed, for example, as studs with nuts as an alternative to the illustrated screws with heads.

Accordingly, while a few embodiments of the present invention have been shown and described, it is to be understood that many changes and modifications may be made thereunto without departing from the spirit and scope of the invention as defined in the appended claims.

What is claimed is:

1. Valve housing comprising,
   a connecting part (2) having two connecting ends and two mutually aligned flow ducts (3,4) which each extend into one of the two connecting ends into the valve housing along a longitudinal axis (11), one of said connecting ends inputs a supply of fluid medium and the other of said connecting ends discharges said fluid medium, respectively;
   said connecting part having a base (10) arranged to a side of the flow ducts;
   a cap (1) having an open end (12) resting on the base of the connecting part and said cap together with the base forming a valve housing interior (24) which communicates with the flow ducts and accommodates a control unit for controlling the flow of fluid medium through the valve housing;
   the connecting part (2) has, on either side next to the base (10) along the longitudinal axis (11) of the flow ducts (3,4), screw fastening means (17,18,20);

the cap (1) has two diametrically opposed laterally projecting screw bearings (13,14) which are arranged along the longitudinal axis (11) of the flow ducts (3, 4);

the cap (1) is connected to the connecting part (2) by two fastening screws (21), which connect said screw bearings (13,14) to said screw fastening means (17,18,20);

connecting flanges (5,6) having screw holes (16) at both connecting ends; and screw bearings (13,14) arranged at such a distance from said open end (12) of the cap (1), that said screw bearings are located radially outside the screw holes (16) of the connecting flanges (5,6).

2. Valve housing according to claim 1, wherein the screw bearings (13,14) are located at a distance from said open end (12) of the cap (1,42); and wherein said screw fastening means of said connecting part (2,35) comprises two projections (17,18) extending in the longitudinal direction of the cap (1,42) with fastening orifices (20) for the fastening screws (21).

3. Valve housing according to claim 2, wherein each of the two projections (17,18) is a post.

4. Valve housing according to claim 2, wherein the projections (17,18) each have a height substantially corresponding to a screw-in length of the fastening screws (21).

5. Valve housing according to claim 1, wherein the base (10) has a circular face;

wherein the cap (1,42) has a substantially circular cross-sectional shape on which the screw bearings (13,14) are arranged in a diametrically opposed manner; and wherein the screw bearings (13,14) each have a width which diminishes from the cap (1,42) to a free end (13*a*,14*a*) of the screw bearings (13,14**).

6. Valve housing according to claim 5, wherein the screw bearings (13,14) have a substantially triangular shape which passes tangentially into an external diameter (D) of the cap (1,42) and each bearing is rounded at the free end thereof.

7. Valve housing according to claim 1, wherein the cap (1,42) has an annular cross section between said open end (12) and the screw bearings (13,14); said cap is provided externally with radial indentations (22,23) adjacent two fastening screws (21) on a far side of the screw bearings (13,14).

8. Valve housing according to claim 1, wherein said cap has a longitudinal axis (19);

wherein the base (10) of the connecting part (2,35) has connecting ducts (30,32,33,36,37) which are axially offset from said longitudinal axis (19) of the cap (1,42) and connect the interior (24) of the valve housing to the flow ducts (3,4);

wherein the control unit (25,38) is located on one connecting duct (30) and has an axial offset located toward the connecting end of the flow duct (4) connected to this connecting duct (30); and the other connecting duct (32,36) is located in the region of maximum distance existing between one connecting duct (30) and the cap (1,42).

9. Valve housing according to claim 8, wherein one connecting duct (30) is axially offset so far that a control unit (25,38) located on this connecting duct (30) is located with its side facing the closer connecting end in the immediate vicinity of the cap (1,42).

10. Valve housing according to claim 8, wherein at least one further connecting duct (33,37) connecting the other flow duct (3) to the interior (24) of the valve housing is arranged in the region of maximum distance between one connecting duct (30) and the cap (1,42) in the base (10) of the connecting part (2,35).

11. Valve housing according to claim 10, wherein the connecting ducts (32,33,36,37) are located in the region of the maximum distance between one connecting duct (30) and the cap (1,42) on either side of the longitudinal axis (11) of the flow ducts (3,4).

12. Valve housing comprising a connecting part (2, 35) having two connecting ends and two flow through ducts (3, 4) aligned with each other, said ducts each extending from one of the two connecting ends along a longitudinal axis (11) into the valve housing, and one of said ducts inputs a supply of fluid medium and the other of said ducts discharging the fluid medium;

the connecting part (2, 35) having a base (10) arranged laterally of the flow through ducts (3, 4);

a cap (1, 42) having an open end (12) resting on the base (10) of the connecting part (2, 35), said cap (1, 42) and the base (10) jointly form a valve housing interior (24) serving for receiving a control unit (25) for controlling the flow of fluid medium through the valve housing;

said base (10) having connection channels (30, 32, 33, 36, 37) connecting the housing interior (24) with the flow through ducts (3, 4);

said connecting part (2, 35) having two projections (17, 18) in the form of poles and extending in the longitudinal direction of the cap (1, 42) on both sides next to the base (10) on the longitudinal axis (11) of the flow through ducts (3, 4);

said cap (1, 42) having two diametrically opposed, laterally projecting screw bearings (13, 14), said screw bearings being arranged on the longitudinal axis (11) of the flow through ducts (3, 4) and with a spacing from the open end (12) of the cap (1, 42); and said cap (1, 42) being connected with two fastening screws (21) to the connecting part 2, 35) which connect the screw bearings (13, 14) with the projections (17, 18).

13. The valve housing according to claim 12, wherein the projections (17, 18) have fastening bores (20) for the fastening screws (21) and the height of the projections (17, 18) substantially corresponds with the length over which the fastening screws (21) are screwed in.

14. The valve housing according to claim 12, wherein the base (10) has a circular face;

wherein the cap (1, 42) has a substantially circular cross-sectional shape on which the screw bearings (13, 14) are arranged in a diametrically opposed manner; and wherein the screw bearings (13, 14) each have a width which diminishes from the cap (1, 42) to a free end (13*a*, 14*a*) of the screw bearings (13,14**).

15. The valve housing according to claim 12, wherein the screw bearings (13,14) have a substantially triangular shape which passes tangentially into an external diameter (D) of the cap (1,42) and each bearing is rounded at the free end thereof.

16. The valve housing according to claim 12, wherein the cap (1, 42) has an annular cross section between said open end (12) and the screw bearings (13,14); said cap is provided externally with radial indentations (22, 23) adjacent two fastening screws (21) on a far side of the screw bearings (13,14).

17. The valve housing according to claim 12, comprising said base (10) of the connecting part (2, 35) having the connection channels (30, 32, 33, 36, 37) offset relative to the longitudinal axis (19) of the cap (1, 42);

said control unit (25, 38) arranged on one connection channel (30) and its axial displacement in located in the direction toward the connection end of the flow through duct (4) connected with said connection channel (30); and the other connection channel (32, 36) arranged in the zone of the largest spacing existing between the one connection channel (30) and the cap (1, 42).

18. Valve housing according to claim 17, wherein one connecting duct (30) is axially offset so far that a control unit (25, 38) located on this connecting duct (30) is located with its side facing the closer connecting end in the immediate vicinity of the cap (1, 42).

19. Valve housing according to claim 17, wherein at least one further connecting duct (33, 37) connecting the other flow duct (3) to the interior (42) of the valve housing is arranged in the region of maximum distance between one connecting duct (30) and the cap (1, 42) in the base (10) of the connecting part (2,35).

20. Valve housing according to claim 19, wherein the connecting ducts 932, 33, 26, 37) are located in the region of the maximum distance between one connecting duct (30) and the cap (1, 42) on either side of the longitudinal axis (11) of the flow ducts (3, 4).

* * * * *